United States Patent
Olson, Jr.

(10) Patent No.: US 6,406,236 B1
(45) Date of Patent: Jun. 18, 2002

(54) PANEL FASTENER AND METHOD OF MANUFACTURE THEREOF

(75) Inventor: Ano H. Olson, Jr., Ortonville, MI (US)

(73) Assignee: Fourslides, Inc., Madison Heights, MI (US)

( * ) Notice: Subject to any disclaimer, the term of this patent is extended or adjusted under 35 U.S.C. 154(b) by 0 days.

(21) Appl. No.: 09/802,817

(22) Filed: Mar. 12, 2001

(51) Int. Cl.[7] ............................ F16B 13/06; F16B 37/04
(52) U.S. Cl. ........................ 411/61; 411/74; 411/182; 411/508; 470/25
(58) Field of Search .................... 411/57.1, 60.2, 411/61, 74, 182, 508, 509, 510; 470/25

(56) References Cited

U.S. PATENT DOCUMENTS

| | | | |
|---|---|---|---|
| 2,336,153 A | * 12/1943 | Ryder | 411/182 X |
| 2,720,135 A | * 10/1955 | Gisondi | 411/61 |
| 3,910,156 A | * 10/1975 | Soltysik | 411/61 |
| 4,430,033 A | * 2/1984 | McKewan | 411/74 X |

OTHER PUBLICATIONS

Photos of prior art clip —origin unknown (undated) (4 sheets).

* cited by examiner

Primary Examiner—Neill Wilson
(74) Attorney, Agent, or Firm—Renner, Kenner, Greive, Bobak, Taylor & Weber (57) ABSTRACT

A fastener for connecting a first panel to a second panel comprises a head and a shaft, the shaft including a plurality of spring legs, each connected at one end to the head and flexing inward and outward relative to the one end. The shaft is dimensioned for insertion into an aperture of the second panel with interference against aperture-defining edges. A plurality of grooves are formed within each spring leg, each groove separated from an adjacent groove by a rib. The rib is configured having a ramped leading surface, a stepped trailing surface and a peak surface disposed between the leading and trailing surfaces. The grooves of one spring leg are axially misaligned with the corresponding grooves of an adjacent spring leg such that each spring leg alternately locks its grooves to the aperture-defining edges of the second panel as the shaft is inserted into the aperture. The head of the fastener can be modified to connect with the first panel in multitude of alternative configurations.

21 Claims, 6 Drawing Sheets

PANEL FASTENER AND METHOD OF MANUFACTURE THEREOF

TECHNICAL FIELD

The present invention relates generally to a fastener and, more particularly, to a fastener for attaching a first panel to a second panel. Specifically, the present invention relates to a fastener for attaching sundry interior and exterior panels or components together in a myriad of applications.

BACKGROUND ART

Threaded, push-on fasteners are well known in the art and are used in the assembly of panels or components together in a wide range of applications. By way of example, such fasteners find use in attaching various trim panels and moldings to sheet metal in the manufacture of automobiles or other vehicles and articles of manufacture such as trucks, tractors, construction equipment, boats, etc. Such fasteners are particularly useful in the attachment of side wall trim panels; head liner trim panels; trunk trim panels; shelf trim panels; garnish molding; seat panel trim; coat hooks, etc. External applications include the attachment of exterior moldings; lights; and metal trim. The aforementioned recitation is not exhaustive and many other applications exist in which push-on fasteners represent a convenient and efficient method for attaching components together.

In practice, for example, such as in the attachment of automotive interior door trim panels to interior sheet metal body panels, aligned pairs of assembly apertures are typically formed to extend through door trim panels and the metal body panels to which they attach at appropriate locations. Fasteners (also interchangeably referred to herein as "retainers" or "clips") are inserted through such co-aligned apertures of the trim panels and metal body panels to securely fasten the trim panels in place. Each clip generally includes a head and an elongate dependant shaft. The head of each clip is positioned against an outward surface of the trim panel surrounding the trim panel aperture or otherwise affixed to the trim panel by alternative fastening means such as a plastic bolt, a screw, or molded into the plastic or rubber panel itself. The clip shaft is sized to project through the sheet metal aperture and includes a series of outwardly directed, spaced-apart tines that engage peripheral edges defining the sheet metal aperture. The tines of the clip are spaced along the longitudinal axis of the shaft and sequentially engage the peripheral edges of the sheet metal aperture as the shaft is inserted through the aperture. Accordingly, the user can, by varying the extent to which the shaft is inserted into its respective sheet metal panel aperture, adjust the spacing between the trim panel and the sheet metal panel to which it attaches. The clip, as a result, can be utilized to fasten trim panels to sheet metal panels of variable thicknesses.

The tines of known retainers are thin-walled plastic fingers that generally circumscribe a cylindrical shaft and have a bias toward the head of the fastener. The tines are spaced at regular intervals along the longitudinal axis of the shaft. The diameter of the shaft from tine tip to tine tip is sized to protrude through an aperture of the sheet metal panel with interference. The bottom surface of the tines slide over the peripheral edges of the sheet metal apertures as the shaft of the fastener is inserted. The bottom biased surface of the ribs minimizes resistance between the shaft and the peripheral sheet metal edges and thereby reduces the force necessary to effectuate insertion of the retainer shaft. As mentioned previously, the tines have a bias toward the head of the fastener such that, upon insertion through a respective sheet metal panel aperture, the tip of each tine is biased against outward sides of the sheet metal panel to resist withdrawal of the retainer shaft from its respective sheet metal aperture. The requisite force necessary to insert the retainer shaft into a sheet metal aperture and to withdraw the shaft therefrom are influenced by multiple variables, including the angle of bias of the tines and the material composition thereof, and the diameter of the aperture relative to the shaft external diameter.

Commercially available fasteners are typical composed of thermoset plastic or thermoplastic composition. The fasteners are formed unitarily by conventional manufacturing processes such as injection molding. Plastic composition allows the fasteners to be manufactured economically and further provides the retainer shaft tines with sufficient resiliency to facilitate their reciprocal travel within a respective sheet metal panel aperture. In the reverse, withdrawal direction, an application of an axially directed extraction force to the head of the retainer pulls the tines of the retainer shaft against outward edge surfaces of the sheet metal panel until the tines undergo a deformation in the reverse direction. Deformation of the retaining tines away from the retainer head allows the retainer shaft to be pulled, generally with difficulty, out of the sheet metal aperture. Subsequent to withdrawal, the resilient shaft tines reconfigure back to their original configuration and resume their bias toward the fastener head. The fastener may then be reused by reinserting the shaft into its respective sheet metal aperture in a forward direction.

It is customary in the manufacture of automobiles to attach and detach the trim panels from the sheet metal panels at several junctures in the assembly process. The trim panels may further require removal during the testing phase of an automobile's assembly to allow for final inspection repairs. To attach and detach the trim panels, the fasteners are inserted into and withdrawn from respective sheet metal apertures as described previously. The plastic composition of conventional fasteners provide the shaft tines with sufficient resiliency with which to allow the tines to compress inward and pass through the slightly undersized sheet metal panel apertures. Unfortunately, however, the edges of the sheet metal apertures are frequently rough and uneven and may include sharp-edged burrs. Repeated insertion and extraction of the retainer shaft tines against such sharp metal edges can cause destruction of the retainer shaft tines or a permanent deformation resulting in a degradation in their performance. Consequently, by the end of the assembly process, the retainer tines may be damaged to the point of necessitating a replacement of the fastener, adding to the cost of the assembly. Alternatively, the fasteners may remain in use but be damaged to the point of providing a less than positive attachment of the trim panel to the sheet metal panel.

A secondary disadvantage to conventional plastic fasteners is that the force required to insert the fastener through a sheet metal aperture or extract the fastener therefrom is greater than optimally desired. The relatively high insertion force and extraction force required in known fasteners can and does, as a result, cause user fatigue and/or injury. Moreover, the insertion and extraction forces for conventional fasteners is fixed and may not be satisfactory for all the myriad applications to which the fastener may find use. In short, the insertion and extraction force of known fasteners is not variable or easily altered which limits the utility of the device in may applications.

Yet a further disadvantage inherent in conventional fasteners is that they are limited in the range of adjustment which they afford in the spacing between the trim panel and the sheet metal panel. The tines along the fastener shafts of conventional clips, due to their biased orientation, are spaced at rather large centerline to centerline gradations. As discussed previously, the fastener adjusts to variable thicknesses of sheet metal by varying the extent to which the fastener shaft is inserted into its respective sheet metal panel aperture. Relatively large tine-to-tine spacing found in conventional fastener shafts provides a less than desired range of adjustment. Accordingly, the user may not be able to position the fastener shafts within their respective sheet metal panel apertures at the precise location providing the desired spacing between the trim panel and the sheet metal body panel.

Thus, the need exists for a push-on fastener for attaching trim panels to sheet metal panels that is durable and capable of withstanding repeated frictional insertion and withdrawal from sheet metal apertures. Such a fastener must further provide a high range of adjustment and require relatively low insertion and withdrawal forces. In addition, the fastener must provide a head configuration that is readily modified to accommodate various methods of connection with a trim panel. Ideally, the insertion and extraction force in a suitable fastener would be readily varied to accomodate use of the fastener in myriad applications.

DISCLOSURE OF THE INVENTION

It is, therefore, an object of the present invention to provide a push-on fastener for attaching one panel to a second panel.

It is another object of the present invention to provide a push-on fastener, as above, requiring a relatively low insertion and a variable extraction force that will not damage the fastener or parts which are connected by the fastener that may be readily varied or reconfigured to accomodate fastener use in sundry applications.

It is yet another object of the present invention to provide a push-on fastener, as above, that is durable and capable of withstanding repeated insertion and extraction cycles without sustaining damage or suffering a degradation in performance.

A further object of the present invention is to provide a push-on fastener, as above, having a capability for attaching to panels of variable thicknesses.

Yet another object of the present invention is to provide a push-on fastener, as above, having a plurality of head configurations for alternative means of attaching the one panel to the second panel.

A further object of the present invention is to provide a push-on fastener, as above, that is economical to manufacture and convenient to install.

Another object of the present invention is to provide a push-on fastener having a fastener head configuration that is readily modified to accommodate various methods of connection with a trim panel.

These and other objects of the present invention, as well as the advantages thereof over existing prior art fasteners, which will become apparent from the description to follow, are accomplished by the improvements hereinafter described and claimed.

A preferred exemplary embodiment and alternative embodiments incorporating the concepts of the present invention are shown by way of example in the accompanying drawings without attempting to show all the various forms and modifications in which the invention might be embodied, the invention being measured by the appended claims and not by the details of the specification. As described, the invention comprises a fastener having a head portion at an upper end and an elongate shaft depending therefrom. The shaft comprises a plurality of spring legs, each leg having one end affixed to the head portion at a bend and an opposite end depending from the head portion. The legs are formed from a malleable, resilient material such that each leg flexes resiliently inward and outward relative to the head portion. Each leg further is formed to provide at least one outwardly projecting locking rib; the locking rib comprising an inclined leading surface, a trailing locking surface, and a peak surface disposed between the leading surface and the locking surface. Insertion of the fastener shaft into an appropriately undersized aperture establishes an inward flexing of the shaft legs. As the locking rib clears the aperture, the leg flexes outward and the locking rib locks the fastener within the aperture.

The insertion and extraction force required by the fastener may be adjusted by varying the angle of leading and trailing surfaces of the locking rib; the spring properties of the material that forms the shaft legs; and/or the bend angle at which the shaft legs connect to the fastener head. Accordingly, a further aspect of the invention is a method of forming an adjustable fastener composed of a malleable material. The method comprises the steps of forming a head portion in a first plane; forming at least one resilient spring leg to depend from the plane of the head portion at a bend; forming at least one locking rib along the spring leg; and adjusting the angle at which the spring leg bends from the plane of the head portion to alter the insertion and extraction force characteristics of the fastener.

PREFERRED EMBODIMENT FOR CARRYING OUT THE INVENTION

Figure 1:
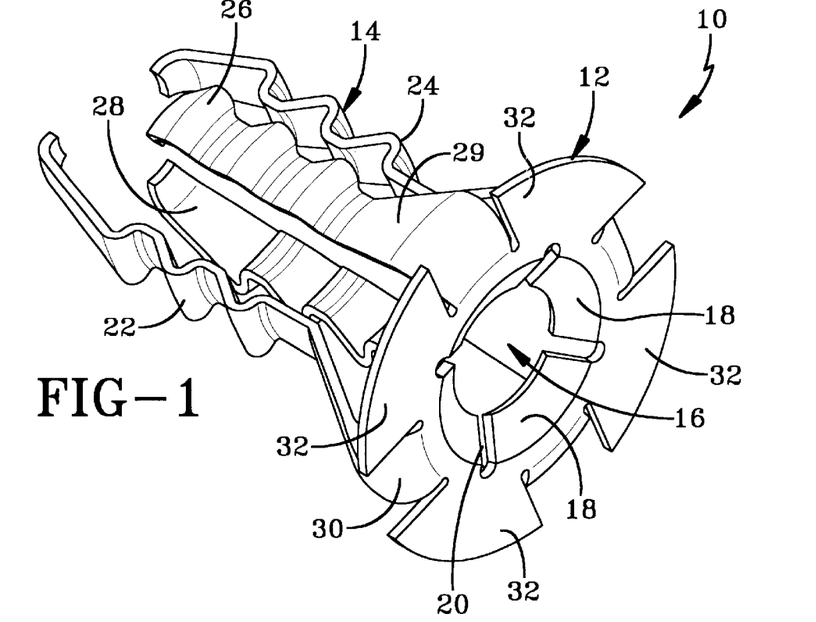
FIG. 1 is a top left perspective view of one fastener incorporating the concepts of the present invention.
Figure 2:
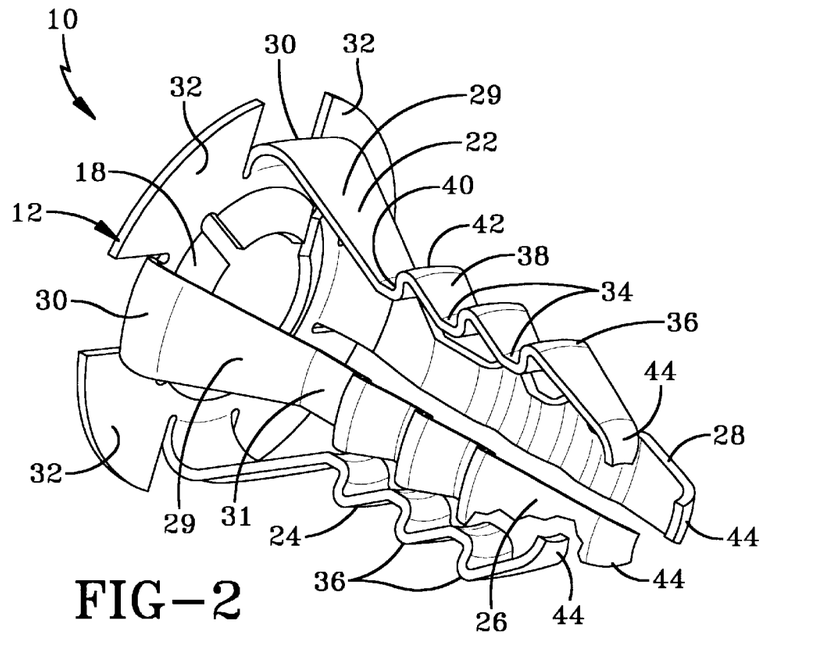
FIG. 2 is a bottom left perspective view thereof.
Figure 3:
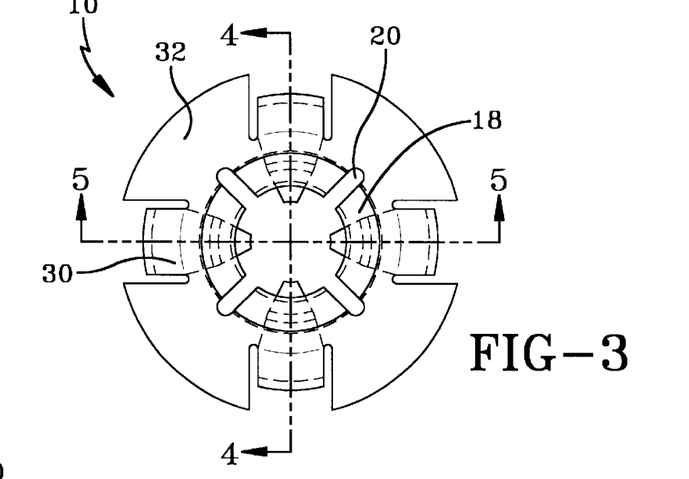
FIG. 3 is a top plan view thereof.

Referring initially to FIGS. 1 and 2, one fastener 10 embodying the present invention is shown to comprise a head 12 and a shaft 14. The fastener 10 is formed of suitably flexible steel stock in the preferred embodiment; however, other materials such as plastic may be utilized, formed by conventional manufacturing methods such as injection molding. The head 12 and shaft 14 in the embodiment of FIGS. 1 and 2 are unitary, formed as a single body from a blank of sheet metal by conventional metal stamping and forming operations. The head 12, during the forming procedure, is punched to provide a center aperture 16 circumferentially defined by four downwardly biased locking tines 18, each tine 18 separated from an adjacent tine by a slot 20. The stamping and forming operations further creates first and second pairs of legs 22, 24 and 26, 28, respectively, configured to depend downward and inward from the plane of the head 12. Each of the legs 22, 24, 26, and 28 includes an inwardly canted upper leg segment 29 connected by a shoulder 30 to the head 12 and legs 26,28 are formed having a shank portion 31. The legs 22, 24, 26, and 28, defining shaft 14, are spaced ninety degrees apart about the periphery of head 12 and extend generally in a parallel, cylindrical formation from the head 12 to remote free leg ends. The legs 22, 24, 26, and 28 thus each represent a cantilever leaf spring that is free to resiliently flex inward and outward about respective shoulders 30 at the head 12. Flexure of the legs inward under compressive force places the legs in an inverted conical formation. Release of the compressive force frees the legs to spring back into the configuration shown in FIGS. 1 and 3. Head flanges 32 are situated between the shoulders 30 of the legs 22, 24, 26, and 28 and lie in a common plane. While the shaft 14, in the embodiment of FIGS. 1 and 2, is, in the quiescent formation, generally cylindrical, defined by parallel legs 22–26, the invention is not intended to be so limited. The legs 22–26 can be formed to depend in the quiescent state from head 14 at an inward or outward attitude relative to the head 14 if so desired.

Referring next to FIGS. 1, 2, 4, and 5, each leg 22–26 is further formed to provide a series of outwardly opening grooves 34 positioned sequentially therealong, with adjacent grooves 34 separated by an outwardly projecting rib 36. The number of grooves along each leg determines the range of adjustment provided by the fastener as will be explained below. Each rib 36 comprises a leading surface 38, a trailing surface 40, and a peak 42 disposed between surfaces 38,40. In the embodiment of FIGS. 1 and 2, the leading surface 38 is ramped at an angle of forty-five degrees and the trailing surface 40 is stepped inward at a ninety degree angle. However, it will appreciated that the angles of inclination of surfaces 38, 40, may be varied without departing from the invention and, in so doing, the cross-sectional shape of grooves 34 will be correspondingly altered. The remote free end 44 of each leg 22–28 bends inwardly as shown. The inward bend of ends 44 facilitates a smooth entry of the legs 22–28 into a panel aperture as will be explained below.

Figure 4:
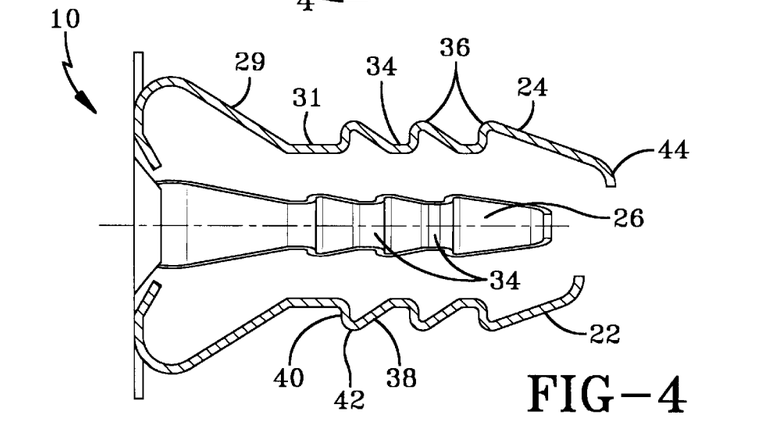
FIG. 4 is a longitudinal sectional view thereof taken along the line 4—4 of FIG. 3.
Figure 5:
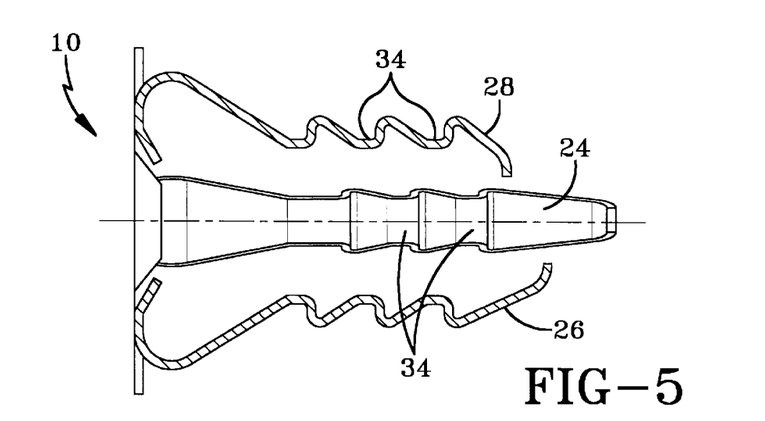
FIG. 5 is a longitudinal sectional view thereof taken along the line 5—5 of FIG. 5.

Specifically referring to FIGS. 4 and 5, it is shown that the grooves 34 of leg 22 are in axial alignment with corresponding grooves 34 of leg 24. Likewise, the grooves 34 of leg 26 are in axial alignment with corresponding grooves 34 of leg 28. The grooves 34 of leg pair 22, 24, and corresponding grooves 34 of leg pair 26,28 are, however, axially offset. FIG. 4 shows the fastener in longitudinal section and FIG. 5 shows the fastener rotated ninety degrees to illustrate the groove offset. It will be noted that the peaks 42 of ribs 36 of legs 22,24 are aligned with grooves 34 of legs 26, 28 as seen from FIG. 4. The offset affords the user of the fastener with a finer incremental range of adjustment than would otherwise be available.

Figure 6:
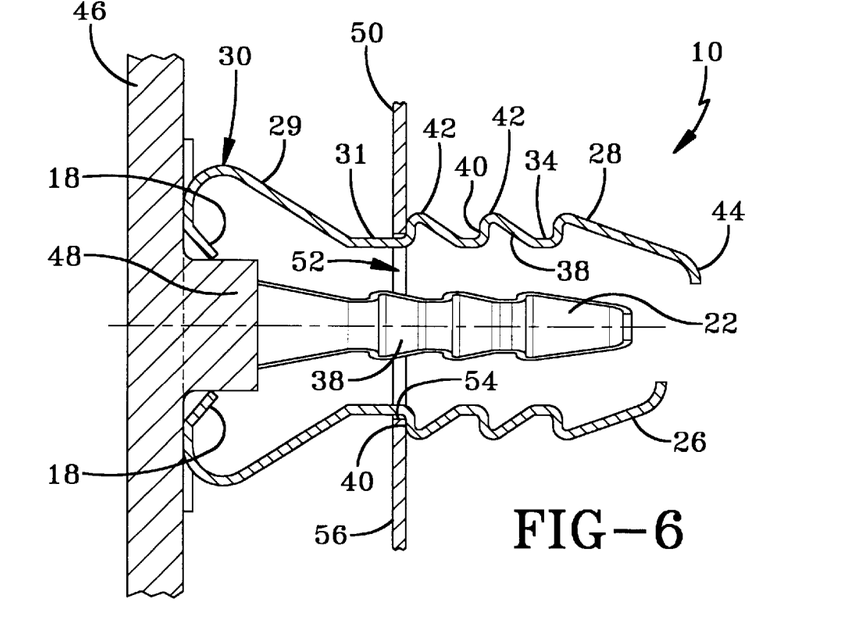
FIG. 6 is a longitudinal sectional view of the fastener connecting a first panel to a second panel.
Figure 7:
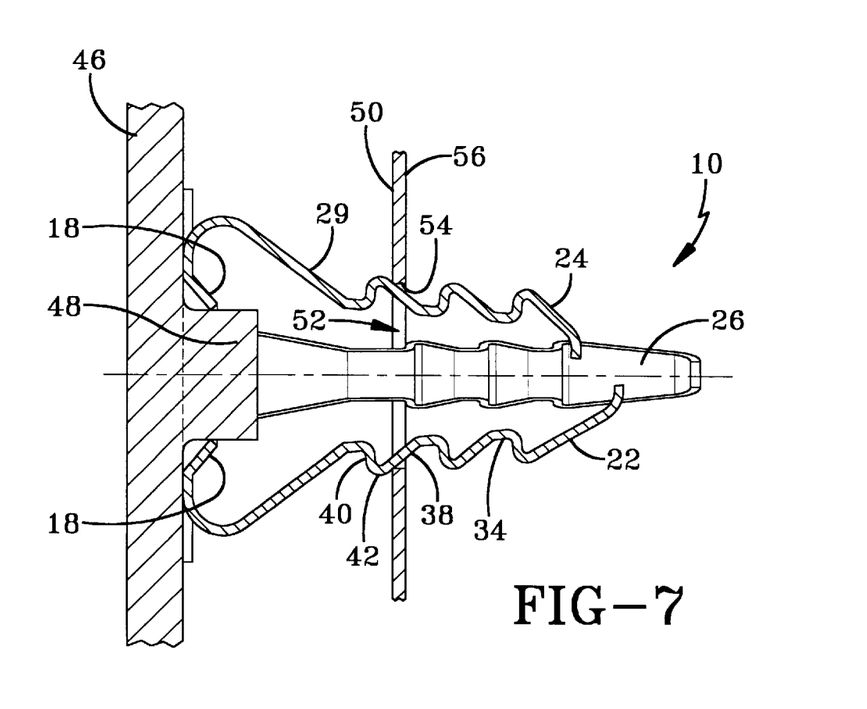
FIG. 7 is a longitudinal sectional view of the assembly of FIG. 6 showing the fastener rotated ninety degrees for illustration purposes.

Continuing, with reference to FIGS. 1, 6 and 7, the subject fastener 10 is shown attaching a trim panel 46 to a sheet metal panel 50, an operation necessary in the manufacture of a wide range of products including automobiles. The trim panel 46 is provided with multiple appropriately located cylindrical bosses 48, each sized to project into the head aperture 16 in interference with the locking tines 18. The tines 18, biased inwardly, engage the circumference of the boss 48 and fixedly connect the fastener 10 to the boss 48. The sheet metal panel 50 is provided with a plurality of through-apertures 52 defined by circumferential panel edges 54. The shaft 14 of fastener 10 is aligned with a corresponding sheet metal aperture 52 and inserted therein as shown. Rolled over ends 44 of the legs 22–28 provide a lead in so that the legs do not impinge upon the panel 50 and stop the progress of shaft 14 into aperture 52. The peak-to-peak sectional dimension of shaft 14 is such that ribs 36 engage the edges 54 as insertion of the fastener into the aperture progresses. The leading ramped surface 38 of each rib 36 engages edges and acts to deflect its respective fastener leg inward, whereby allowing the peak 42 of the rib 36 to pass the aperture 52. The leg, upon deflection, is under tension until the rib 36 clears the aperture. As the peak 42 of rib 36 passes the aperture to an rearward side of panel 50, the associate leg resiliently springs outward, placing the trailing surface 40 of the rib 36 against the panel and aperture edges 54 within groove 34. The trailing surface 40 of the rib is stepped at a right angle to engage flat against the rearward side of panel 50 when in the locking position.

As the shaft 14 is progressively inserted a greater distance into the aperture 52, the ribs 36 sequentially engage and pass the aperture edges 54 until the desired spacing between the panels 46 and 50 is achieved. In FIG. 6, the fastener has been inserted to the last rib of arms 26, 28; that is, the rib closest to the head 12. The channels 34 of legs 22, 24 are, as explained previously, axially offset from the position of corresponding channels 34 of legs 26, 28. Accordingly, as shown in FIGS. 6 and 7, the leading surface of ribs 36 of legs 22, 24 are in engagement with the edges 54 of aperture 52 when the trailing surface 40 of ribs 36 of legs 26, 28 are in a locking position against an underside 56 of panel 50. The legs 22, 24 are in a state of inward flexure and exert outwardly directed spring forces upon edges 54 of aperture 52. Such outward forces exerted by legs 22, 24 operate to center and stabilize the fastener within its sheet metal aperture 54. Thus, the compressed spring legs 22, 24 center and laterally stabilize the fastener while legs 26, 28 lock the fastener into its desired axial position within the aperture 54.

It will further be noted from FIGS. 6 and 7 that the ribs 36 of leg pair 22, 24 and leg pair 26, 28 alternately lock against the sheet metal panel 50 as the fastener is inserted into aperture 54. When the ribs 36 of one pair of legs is positioned in locking engagement with the panel 50 the corresponding but offset ribs 36 of the opposite pair of legs engages and exerts outwardly directed spring force against the edges 54 of aperture 52. Consequently, the leg pairs 22, 24, and 26, 28 alternatively perform the locking and stabilization functions as the fastener is progressively inserted into aperture 54. Moreover, the offset between the grooves 34 of leg pair 22, 24 and leg pair 26, 28 allows for finer axial adjustment of the fastener within its aperture 54. In effect, there are twice as many locking positions along the shaft 14 with offset grooves between the leg pairs than would otherwise be possible.

The aforementioned alternative engagement of leg pairs 22, 24 and 26, 28 against edges 54 further provides an additional benefit. The insertion forces required to insert the fastener shaft 14 into its respective aperture 52 is substantially reduced because the ribs of only one pair of legs (22,24 or 26, 28) engage against the edges 54 of aperture 52 at a given time; the ribs of the opposite pair of legs at which time being in an outward locking position. The fastener can thereby be inserted into its associate aperture with minimal requisite insertion force. In the event that disattachment of panels becomes necessary at any point during or after the assembly process, the offset of grooves 34 in the leg pairs 22, 24 and 26, 28 further provides the advantage of minimizing the requisite withdrawal or extraction force. With only two legs at a time engaged against the panel 50 in a locking position, the withdrawal force must only be sufficient to deflect via the locking ribs 36 two locking legs inward. The leg pairs 22, 24, and 26, 28 are alternatively disengaged from locking engagement with the aperture edges 54 as the shaft is withdrawn until the last ribs 36 clear the aperture 52. The fastener thus requires a substantially lower extraction force than would be necessary were the ribs of all four legs in simultaneous locking engagement with the panel edges 54.

It will further be appreciated that the subject fastener is relatively immune from damage from uneven or burred aperture edges 54 during fastener withdrawal and insertion. The fastener legs 22–28 are free to deflect inward in response to engagement against rough or burred edges, whereby minimizing abrasion between the legs and the aperture edges during insertion and withdrawal. In addition, while the fastener can be formed of softer material such as plastic, it can also be formed from a hard spring material such as steel. The harder material is even less prone to damage from engagement against uneven aperture edges.

The tines 18 of the head 12 engage boss 48 of the panel 46 and fixedly connect the fastener 10 to the panel 46. In the attached position, the panel 46 abuts against the head flanges 32. Removal of the fastener 10 from the sheet metal panel 50 can be effected without detaching the fastener 10 from panel 46. Moreover, the spacing between the panels 46, 50 can be adjusted by varying the relative extent to which the fastener 10 is inserted into its respective sheet metal aperture. The leg segments 29 and shank segments 29 can further be dimensioned to operate as spacers between the panels 46, 50 such that insertion of the fastener 10 into aperture 52 up to the last rib 36 will result in a desired spacing between the panels 46, 50.

Figure 8:
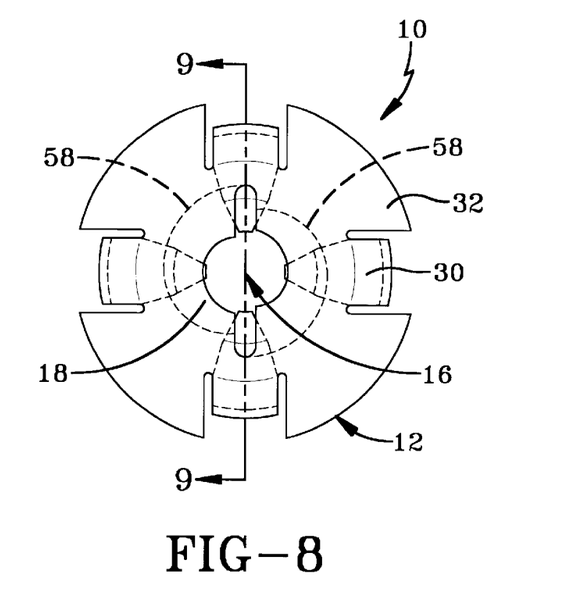
FIG. 8 is a first alternative fastener embodiment of the subject invention showing a threaded fastener head.
Figure 9:
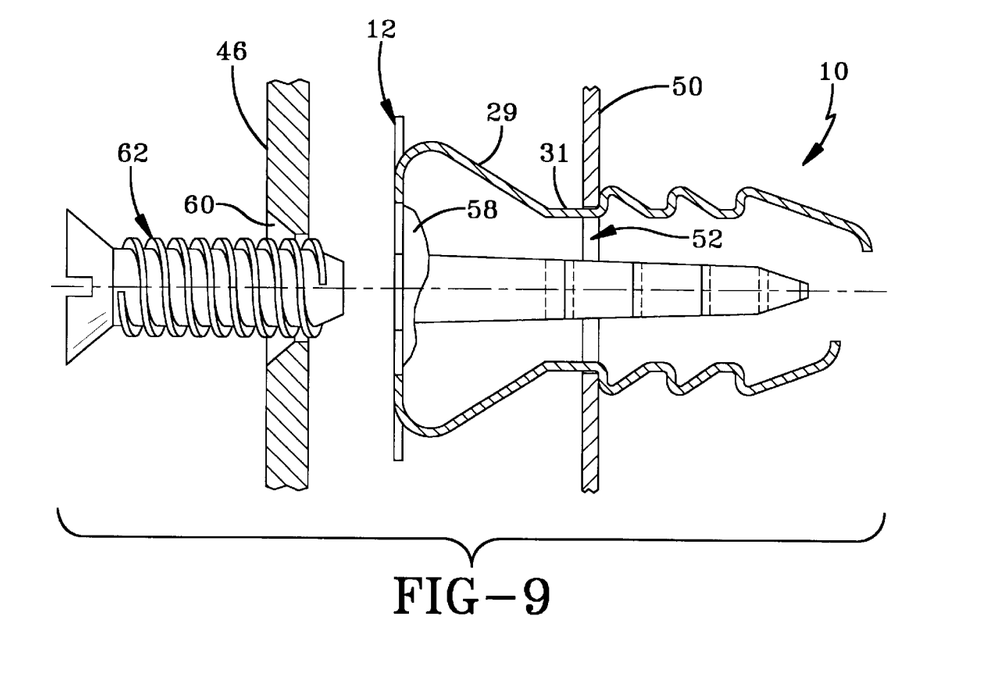
FIG. 9 is a longitudinal sectional view of an assembly comprising the first alternative fastener embodiment viewed along line 9—9 of FIG. 8; a first panel; a second panel; and an assembly screw.

FIGS. 8 and 9 illustrate an alternate, screw threaded head 12 configuration for fastener 10. The tines 18 of the head 12 are adapted to provide screw thread edges 58 as shown in FIG. 8. The edges 58 are formed to depend into aperture 16 progressive distances to form the desired threaded socket. The trim panel 46 is further modified to provide a counterbore 60 into which a screw 62 is seated. It will be appreciated that the screw 62 is inserted through the trim panel aperture and turned into the fastener socket formed by screw thread edges 58. Resultantly, the panel 46 is fixedly attached to fastener 10 and fastener 10 can thereafter be inserted into a respective aperture 52 of the sheet metal panel 50 in the manner described previously. The fastener can likewise be removed from the panel 50 and reattached if necessary as explained above.

Figures 10, 11, 12:
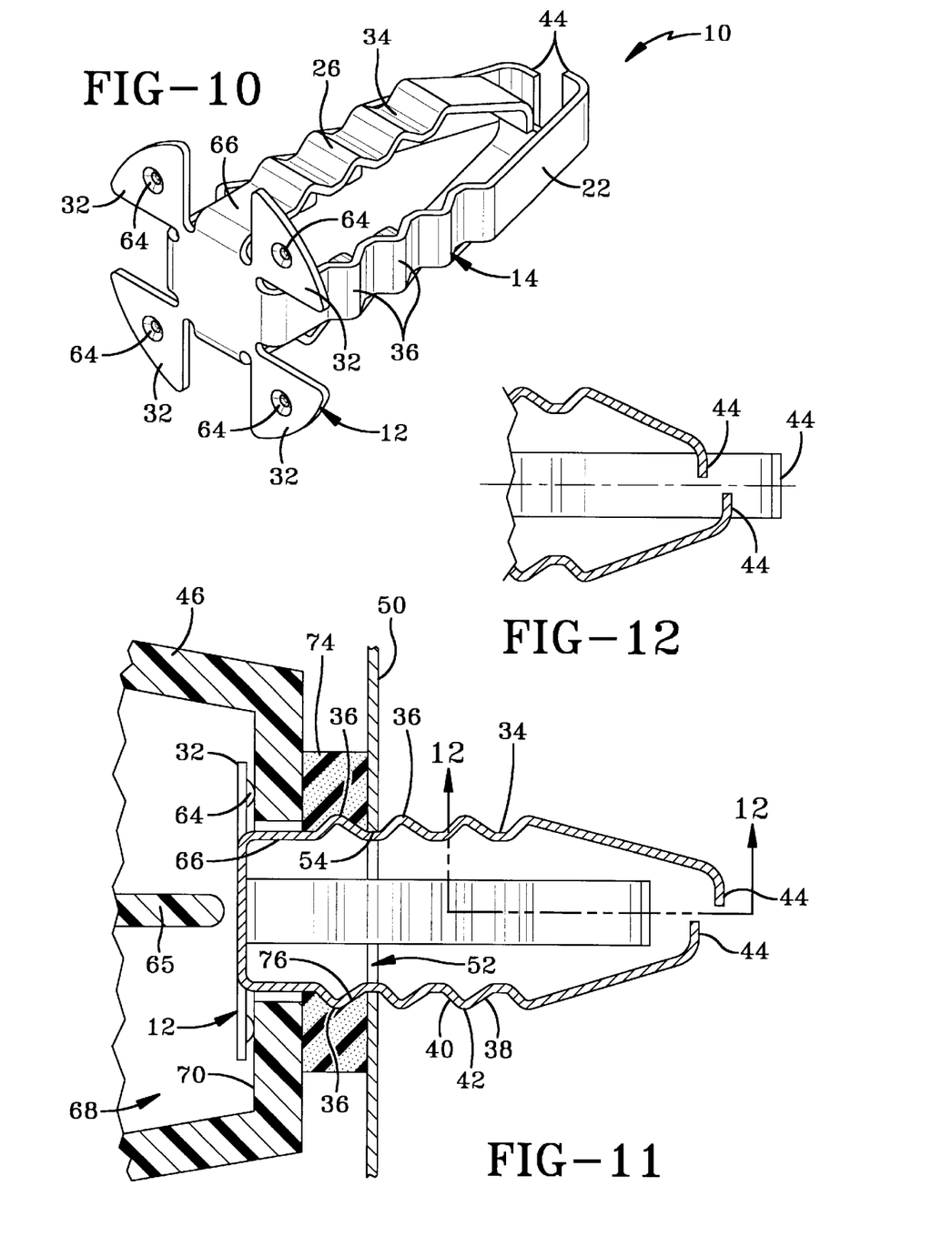
FIG. 10 is a top plan view of a second alternative fastener embodiment of the subject invention showing a dog house fastener head.
FIG. 11 is a longitudinal sectional view of an assembly incorporating the second alternative fastener embodiment viewed along line 11—11 of FIG. 10; a first panel; a second panel; and an insulation panel.
FIG. 12 is a partial longitudinal section view through the fastener of FIG. 11 taken along the line 12—12.

FIGS. 10,11, and 12 depict a second embodiment of the fastener 10, intended for use within a doghouse panel 46. The fastener 10, as with the fastener in the embodiment of FIG. 1, comprises a head 12 and a shaft 14 depending therefrom. The shaft 14 further includes four leg members 22, 24, 26, and 28, each having a plurality of alternative grooves 34 and ribs 36 disposed therealong. The head 12 is modified to provide a downward protrusion 64 centrally disposed within each head flange 32. The protrusion 64 is rounded over a terminal lower surface as seen from FIG. 11. The legs 22, 24, 26, and 28 are connected to the head 12 by respective shank portions 66, the shank portions 66 of the legs forming a cylindrical segment proximate head 12. The panel 46 has a plurality of doghouse recesses 68 therein terminating at a surface 70 through which an aperture 72 extends. A third panel 74 of sound insulative material, such as polyurethane, is interposed between the lower surface 70 of the doghouse 68 and the sheet metal panel 50. The insulation panel 74 provides a through aperture 76 that aligns with the doghouse aperture 72 and the sheet metal panel aperture 52.

It will be appreciated from FIG. 11 that the fastener 10 is inserted into doghouse 68 and through aperture 72. Shaft 14, comprising legs 22, 24, 26, and 28 project through the insulation panel aperture 76 and into the sheet metal aperture 52 until the head protrusions 64 abut against doghouse surface 70. In the final position, an uppermost one of ribs 36 engage against insulation panel surfaces defining aperture 76 and panel 50 resides within a groove 34 between the uppermost rib and a lower adjacent rib. In the fastener embodiment shown in FIG. 11, the ribs 36 are configured such that the leading and trailing surfaces 38, 40, respectively, are ramped at a forty-five degree angle toward peak 42. The resilient spring legs 22–28 operate as described above. Engagement of the ribs 36 with sheet metal edges 54 caused the legs to undergo resilient spring deflection inward, whereby allowing the shaft 14 to pass through the aperture. Upon clearing the panel 50, the legs are free to spring outward, trapping the edges 54 of the sheet metal panel 50 within a groove 34 and locking the fastener in place.

It will further be appreciated that, in the embodiment shown in FIG. 11, there is no offset between the axial positionment of grooves 34 along leg pair 22, 24 and leg pair 26, 28. The grooves 34 of each leg 22–28 axially align with the axial position of the grooves 34 of each other leg. The resilient deflection and return of the legs 22–28 during insertion of the fastener 10 through the sheet metal panel 50 evades any sharp burrs that may exist on edges 54 and avoids damage to the ribs 36.

Figure 13:
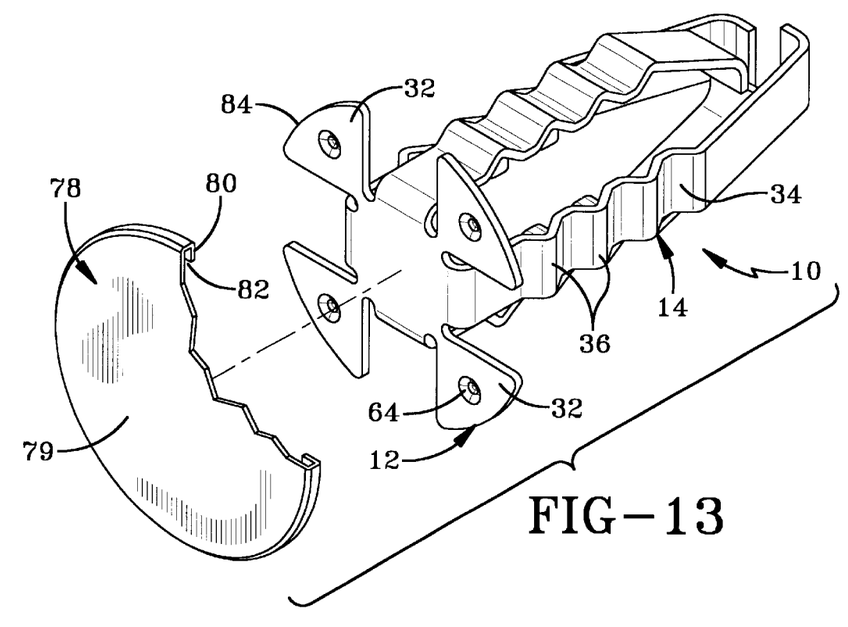
FIG. 13 is an exploded perspective view of a third alternative fastener embodiment.
Figure 14:
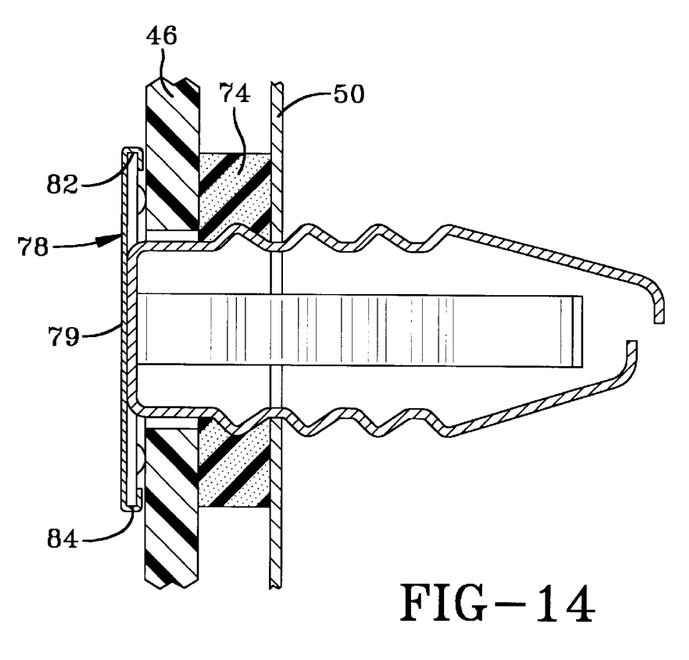
FIG. 14 is a longitudinal sectional view of an assembly incorporating the third alternative fastener embodiment; a first panel; a second panel; an insulation panel; and a cover member.

FIGS. 13 and 14 depict a third alternate embodiment of the fastener 10, intended for use in attaching a planar trim panel 46 and an underlying insulative panel 74 to a sheet metal panel 50. The fastener 10 is configured and utilized as described in the embodiment of FIGS. 10–12. Additionally, a cap 78 is provided for enclosing the head 12 for aesthetic and decorative purposes. The cap 78 comprises a circular disc body 79 have underturned peripheral edges 80 that define a peripheral underside channel 82. The cap 78 may be formed of any suitable such as plastic and may include a fabric covering if desired. The cap 78 is attached to the head 12 as the cap channel 82 is pulled over and receives peripheral edges 84 of the fastener head flanges 32 therein. The cap member, so positioned, covers the head 12 and provides a preferred aesthetic appearance.

Based upon the foregoing disclosure, it will be apparent that the fastener, as described above and illustrated in the accompanying drawings, achieves the stated objects of the invention as well and otherwise constitutes an advantageous contribution to the art. The fastener is utilized without the need for tools and couples a trim panel 46 to a sheet metal panel 50 in push-on fashion. The fastener is readily stamped and formed from a sheet metal blank into its desired configuration and may be manufactured from alternative materials such as plastic by alternative means such as injection molding. The legs 22–28 of the shaft 14 comprise resilient leaf springs attached to the head 12 in cantilever fashion. The legs flex inward during insertion and removal of the fastener through a sheet metal aperture to avoid damaging contact with metal burrs or the like. Upon passage through the aperture, the legs flex outward and assume a locking relationship to the sheet metal panel.

It will further be noted that the fastener provides a series of ribs and grooves along each leg by which to accommodate panels of varying thicknesses. The ribs of the fastener comprise a leading surface and a trailing locking surface and varying the angle of inclination of such surfaces can modify the force required to insert the fastener through and remove the fastener from its respective sheet metal aperture. Moreover, the grooves of a leg of the fastener can be placed in an axial offset from the grooves of an adjacent leg of the fastener so that when the groove of the first leg is in locking position with the sheet metal aperture, a leading surface of the rib of the adjacent leg is in spring engagement against the sheet metal aperture edges. Such an offset provides an increased range of adjustment possible with the fastener and reduces the insertion and withdrawal forces required to utilize the fastener.

The head 12 of the fastener may be modified as taught above into alternative configurations to accommodate alternative methods of affixing the fastener to a trim panel. The alternative head configurations described above, and others apparent to those skilled in the art, are readily and inexpensively made to the fastener and allow the fastener to be used in myriad panel connections.

While the fastener 10 is shown as comprising two pairs of legs 22, 24 and 26, 28, it will be appreciated that a greater or lesser number of legs may be employed if desired. In order that alternate legs have an offset in their axial grooves, at least two legs are required. Also, for the sake of stability, it is desired but not necessary that the legs be on opposite sides of the head 12. More than two pairs of legs may be formed in the fastener.

The insertion and extraction force required by the fastener may be adjusted by varying the angle of leading and trailing surfaces of the locking rib; the spring properties of the material that forms the shaft legs; and/or the bend angle at which the shaft legs connect to the fastener head. Accordingly, a further aspect of the invention is a method of forming an adjustable fastener composed of a malleable material. The method comprises the steps of forming a head portion in a first plane; forming at least one resilient spring leg to depend from the plane of the head portion at a bend; forming at least one locking rib along the spring leg; and adjusting the angle at which the spring leg bends from the plane of the head portion to alter the insertion and extraction force characteristics of the fastener. The insertion and withdrawal forces necessary to deploy and remove the fasteners may be altered by varying the spring properties of the legs. A more rigid material or a greater cross-sectional thickness tending to reduce the resiliency of the legs will increase the level of requisite insertion and removal force. In the preferred embodiment, the fastener is composed of commercially available, malleable steel. However, other materials may be substituted.

The configuration of the ribs 36, as explained above, may also be modified to vary the insertion and withdrawal forces that the fastener requires. A steeper angle of inclination in the leading surface 38 will increase the force necessary to insert the fastener. Similarly, the trailing locking surface 40 can be modified between the stepped configuration shown in FIGS. 1 and 2 to the ramped configuration shown in FIGS. 10–12 to reduce the retentive properties of the fastener and to thereby allow withdrawal of the fastener with relatively less force.

The insertion and withdrawal forces may further be altered or adjusted by varying the angle at which the legs depend from head 12. A relatively large taper angle to the legs will serve to reduce the force necessary to effect an insertion and withdrawal of the fastener. Conversely, the spring legs may be readily formed to depend at a right angle from the head or at a relatively small taper angle. So configured, a relatively greater force will be required to deflect the legs inward during insertion and withdrawal. Because the fastener is formed from a malleable material, such as steel, an alteration to the insertion and extraction characteristics of the fastener can be effected in a post-manufacture environment by mechanically or manually bending the spring legs relative to the fastener head. An alteration of the angle of taper of legs 22, 24, 26, and 28 can be readily accomplished at the initial formation stage or; subsequently when the fastener is employed to adjust the spring characteristics of the legs.

While the above describes alternative embodiments of and uses for the subject invention, the invention is not intended to be so restricted. Other embodiments and uses of the invention, which will be apparent to those skilled in the art and which utilize the teachings herein set forth, are intended to be within the scope and spirit of the invention.

What is claimed is:

1. A fastener comprising:
   a head portion;
   an elongate shaft comprising a plurality of spring legs, each leg having one end affixed to the head portion and an opposite end depending from the head portion, and each leg reciprocally flexing inward and outward about its respective one end;
   at least one outwardly projecting locking rib carried by each spring leg, the locking rib comprising an inclined leading surface, a trailing locking surface and a peak surface disposed between the leading surface and the locking surface, and wherein the locking rib trailing surface extends substantially normal to a longitudinal axis of the shaft.

2. A fastener according to claim 1, wherein the spring legs are disposed on opposite sides of the shaft.

3. A fastener according to claim 1, wherein the spring legs comprise a first pair of spring legs positioned on substantially diametrically opposite sides of the shaft.

4. A fastener according to claim 3, wherein the first p air of spring legs each includes a plurality of said outwardly directed locking ribs, each locking rib being separated from an adjacent locking rib by a groove positioned in axial alignment with a corresponding groove of the opposite spring leg of the first pair.

5. A fastener according to claim 4, wherein the shaft further comprising at least a second pair of spring legs positioned on substantially diametrically opposite sides of the shaft, wherein the second pair of spring legs each include a plurality of said outwardly directed locking ribs, each locking rib being separated from an adjacent locking rib by a groove positioned in axial alignment with a corresponding groove of the opposite spring leg of the second pair.

6. A fastener according to claim 5, wherein the grooves of the first pair of spring legs are axially offset from the grooves of the second pair of spring legs.

7. A fastener according to claim 6, wherein the grooves of the first pair of spring legs are in axial alignment with the leading surfaces of the ribs of the second pair of spring legs.

8. A fastener according to claim 3, wherein the remote ends of the spring legs are inwardly rounded.

9. A fastener comprising:

a unitary body including a head portion lying substantially in a first plane and at least a first spring leg having a shoulder at one end formed integrally with the head portion, the spring leg depending from the shoulder and reciprocally flexing inward and outward relative to the shoulder at the one end and including a plurality of outwardly opening grooves spaced therealong, each of said grooves being separated from an adjacent groove by a locking rib.

10. A fastener according to claim 9, wherein the locking rib comprising an inclined leading surface, a trailing locking surface, and a peak surface disposed between the leading surface and the locking surface.

11. A fastener according to claim 9, wherein the head portion includes a flange for engageably connecting to a first panel.

12. A fastener according to claim 11, wherein the flange comprises a socket extending therein dimensioned to receive a boss projection from the first panel.

13. A fastener according to claim 12, wherein the socket is defined at least in part by a bias ed retention tine.

14. A fastener according to claim 11, wherein the flange comprises a threaded socket extending therein.

15. A fastener according to claim 9, wherein further comprising at least a second spring leg positioned adjacent to said first spring leg, said second spring leg having a shoulder at one end formed integrally with the head portion and extending from the head portion in a direction substantially normal to the first plane, and the second spring leg reciprocally flexes inward and outward relative to said shoulder at said one end.

16. A fastener according to claim 15, wherein said first and said second spring leg each include a plurality of outwardly opening grooves spaced therealong, each of said grooves being separated from an adjacent groove by a locking rib.

17. A fastener according to claim 16, wherein the grooves of the second spring leg are axially misaligned relative to corresponding grooves of the first spring leg.

18. A fastener according to claim 9, wherein the first spring leg comprises a cantilever leaf spring.

19. A fastener according to claim 18, wherein the angle at which the spring leg is connected to the head portion is adjustable to vary the insertion and withdrawal force characteristics of the fastener.

20. A method of manufacturing an adjustable fastener comprising the steps of:

forming a head portion;

forming at least one spring leg of malleable material to depend from the head portion at a bend angle and resiliently flexing laterally relative to the head portion;

forming a plurality of outwardly opening grooves spaced along the spring leg, each of said grooves being separated from an adjacent groove by a locking rib; and adjusting the bend angle of the spring leg to alter the lateral flex characteristics of the spring leg.

21. A method according to claim 20, wherein further comprising the the step of forming each locking rib in the spring leg to comprise an inclined leading surface, a trailing surface, and a peak surface disposed between the leading and trailing surfaces.

* * * * *